US011795954B2

(12) United States Patent
Tosun (10) Patent No.: US 11,795,954 B2
(45) Date of Patent: Oct. 24, 2023

(54) EFFICIENT AXIAL FAN WITH MULTIPLE PROFILES AND BEAM

(71) Applicant: GT KARBON IZLEME VE ENERJI VERIMLILIGI SANAYI TICARET LIMITED SIRKETI, Istanbul (TR)

(72) Inventor: Savas Tosun, Istanbul (TR)

(73) Assignee: GT KARBON IZLEME VE ENERJI VERIMLILIGI SANAYI TICARET LIMITED SIRKETI, Istanbul (TR)

(*) Notice: Subject to any disclaimer, the term of this patent is extended or adjusted under 35 U.S.C. 154(b) by 0 days.

(21) Appl. No.: 18/008,192

(22) PCT Filed: Jun. 3, 2020

(86) PCT No.: PCT/TR2020/050482
§ 371 (c)(1),
(2) Date: Dec. 5, 2022

(87) PCT Pub. No.: WO2021/246976
PCT Pub. Date: Dec. 9, 2021

(65) Prior Publication Data
US 2023/0279862 A1 Sep. 7, 2023

(30) Foreign Application Priority Data
Jun. 3, 2020 (TR) .................. 2020/08559

(51) Int. Cl.
*F04D 19/00* (2006.01)
*F04D 29/38* (2006.01)

(52) U.S. Cl.
CPC .......... *F04D 19/002* (2013.01); *F04D 29/384* (2013.01)

(58) Field of Classification Search
CPC ............................ F04D 19/002; F04D 29/384
See application file for complete search history.

(56) References Cited

U.S. PATENT DOCUMENTS

| 1,553,627 A | 9/1925 | Nagler |
| 2009/0081047 A1 | 3/2009 | Koike |
| 2015/0354530 A1 | 12/2015 | Harrison |

FOREIGN PATENT DOCUMENTS

| DE | 29601634 U1 | 4/1996 |
| EP | 2006537 A2 | 12/2008 |

(Continued)

*Primary Examiner* — Jacob M Amick
*Assistant Examiner* — Charles J Brauch
(74) *Attorney, Agent, or Firm* — Bayramoglu Law Offices LLC (57) ABSTRACT

An efficient axial fan includes an upper camber with a linear angle upper surface that expands from the leading edge of upper camber to the top of the surface and decreases from this peak to the trailing edge of upper camber, a lower camber with the parabolic curve vertex surface and the reverse parabolic curve vertex surface and the pointed lower surface as a result of a sudden curve towards the trailing edge of lower camber of the surface, a tip end connecting the ends of the wings to prevent eddies to form at the ends, a roof end connecting the bottom of the wings, at least one middle beam positioned between the lower camber and the upper camber associated with the tip end and the roof end, and a mean camber fixed on the middle beam located 90 degrees perpendicularly between the lower camber and the upper camber.

13 Claims, 6 Drawing Sheets

(56) References Cited

FOREIGN PATENT DOCUMENTS

| | | | | |
|---|---|---|---|---|
| EP | 3179093 | A1 * | 6/2017 | ........... F03D 1/0633 |
| EP | 3179093 | A1 | 6/2017 | |
| TR | 201802448 | A2 | 3/2018 | |
| TR | 201916253 | | 12/2019 | |

* cited by examiner

EFFICIENT AXIAL FAN WITH MULTIPLE PROFILES AND BEAM

CROSS REFERENCE TO THE RELATED APPLICATIONS

This application is the national phase entry of International Application No. PCT/TR2020/050482, filed on Jun. 3, 2020, which is based upon and claims priority to Turkish Patent Application No. 2020/08559, filed on Jun. 3, 2020, the entire contents of which are incorporated herein by reference.

TECHNICAL FIELD

The present invention relates to efficient axial fan with multiple profiles and beam that can be used in air circulation of cooling towers, vehicle radiators, farm ventilation, air conditioning systems, aircraft (helicopter, drone) propellers and wind turbines.

BACKGROUND

Wind energy is caused by solar radiation heating the ground surface differently. This warming difference causes a pressure difference to occur between the sea and the land, and this pressure difference causes the air to move. The movement of air from high pressure to low pressure is defined as wind. It is used by converting wind energy into mechanical energy or electrical energy.

Utilization of wind energy depends entirely on the wing geometry. For this reason, airfoils used in aircraft have had an important effect on the development of wind turbines. These wing profiles can show different performance curves at different air velocities and different angle of attack. Depending on the purpose used, wing profiles can be tested in wind tunnels and their performances can be measured. Since wind blowing at different speeds and angles affects wing performances, it is almost impossible to find a wing profile that will perform best in any situation. Although many wind wings have been created for different applications, it can be seen that new wing profiles should be investigated in order to provide higher efficiency.

The development of wing profiles is mostly based on aircraft wing profiles. For instance; NACA230, NACA44, NACA63-2, and FX wings are some of them. The performance of a wing profile is generally measured by the ratio of the lift force coefficient ($C_L$) and the drag force coefficient ($C_D$). The main target is that the lift coefficient is high and the drag coefficient is low. As a result, this situation directly affects the efficiency of the system. In addition to the increase in efficiency, the sound factor emitted by the systems is also important. In the existing systems, it has led to the emergence of such an invention due to the inadequacy of a solution that enables the system to operate silently by both increasing the efficiency and reducing the effect of turbulence.

Turkish Patent Number 2018/02448 issued on Feb. 21, 2018, discloses a new double-wing profile with an intermediate beam. The invention is a new dual blade profile with intermediate beam that can produce high torque and high power for use in wind turbine propeller blades. With this new invention, energy conversion systems and machines that operate according to the aerodynamic principle work more efficiently. In addition, by applying it to newly built and working wind turbines, both performance increase, safe operation and life span of the wind turbine are provided.

Turkish Patent Number 2019/16253 issued on Oct. 22, 2019, discloses a new high-efficiency fan blade profile with low energy consumption. The invention is highly efficient and performance for use in cooling tower fans, absorbent fan blades, aspirators blades, ventilator blades, gas turbine blades, steam turbine blades, centrifugal water pump fans, road sweeping machine fans, vacuum cleaner fans, vehicle spoilers, on-board luggage is a new wing profile. With this new wing profile, energy conversion systems and machines operate more efficiently, working according to the aerodynamic principle.

American Patent Number US20150354530A1 issued on Dec. 10, 2015, discloses a multiple airfoil wind turbine blade assembly. A wind turbine blade assembly for a wind turbine having a root portion proximal to a hub of said wind turbine and a tip portion distal to said hub, comprising a primary airfoil having a primary leading edge and a secondary airfoil having a secondary leading edge wherein there is an aerodynamic gap between said primary airfoil and said secondary airfoil, with said primary airfoil configured to be located upwind of said secondary airfoil when assembled on the wind turbine.

In the above-mentioned inventions, a new system was designed using two wing profiles. As a result of the effect of the structure of the wing profiles and the two wing profiles in these systems, the turbulence effect of the fluid entering the air tunnel from the attack edges and the subsequent sound problem, the lifting force of the fluid leaving the trailing edge is weak and the efficiency is low are the main disadvantages of the above systems.

American Patent Number US2009081047A1 issued on Mar. 26, 2009, discloses a multi-element blade with aerodynamic profiles. The objective of this invention is to obtain rotor blades for large-sized horizontal axis wind turbines that allow easy transport, handling and storage at the same time guaranteeing greater efficiency in the use of wind energy. The present invention results in a blade made up of two or more elements arranged collaterally and preferably fixed among themselves such as to cause an aerodynamic interference between said elements.

In the profile wing structures of the above-mentioned invention, due to the fact that the air entering from the edge of the attack does not create a high amount of force on the lower surface of the wing, it creates inefficiency in the turbine and the absence of any profile blades in the middle will cause the air not to leave the air tunnel silently and cause turbulence.

Consequently, there is a necessity for a novel technology that is capable of eliminating above mentioned disadvantages, that can be produced at low cost, can be produced in one piece, easy to install, has high efficiency compared to other existing systems, that eliminates the turbulence effect of the fluid, silent and environmentally friendly, has a feature that can be applied to different areas, low energy consumption, light and robust.

SUMMARY

The present invention is an efficient axial fan with multiple profiles and beam characterized in that it is a novel technology that can be produced at low cost, can be produced in one piece, easy to install, has high efficiency compared to other existing systems, that eliminates the turbulence effect of the fluid, that can be applied to different areas, silent and environmentally friendly, low energy consumption, light and robust.

Figure 1:
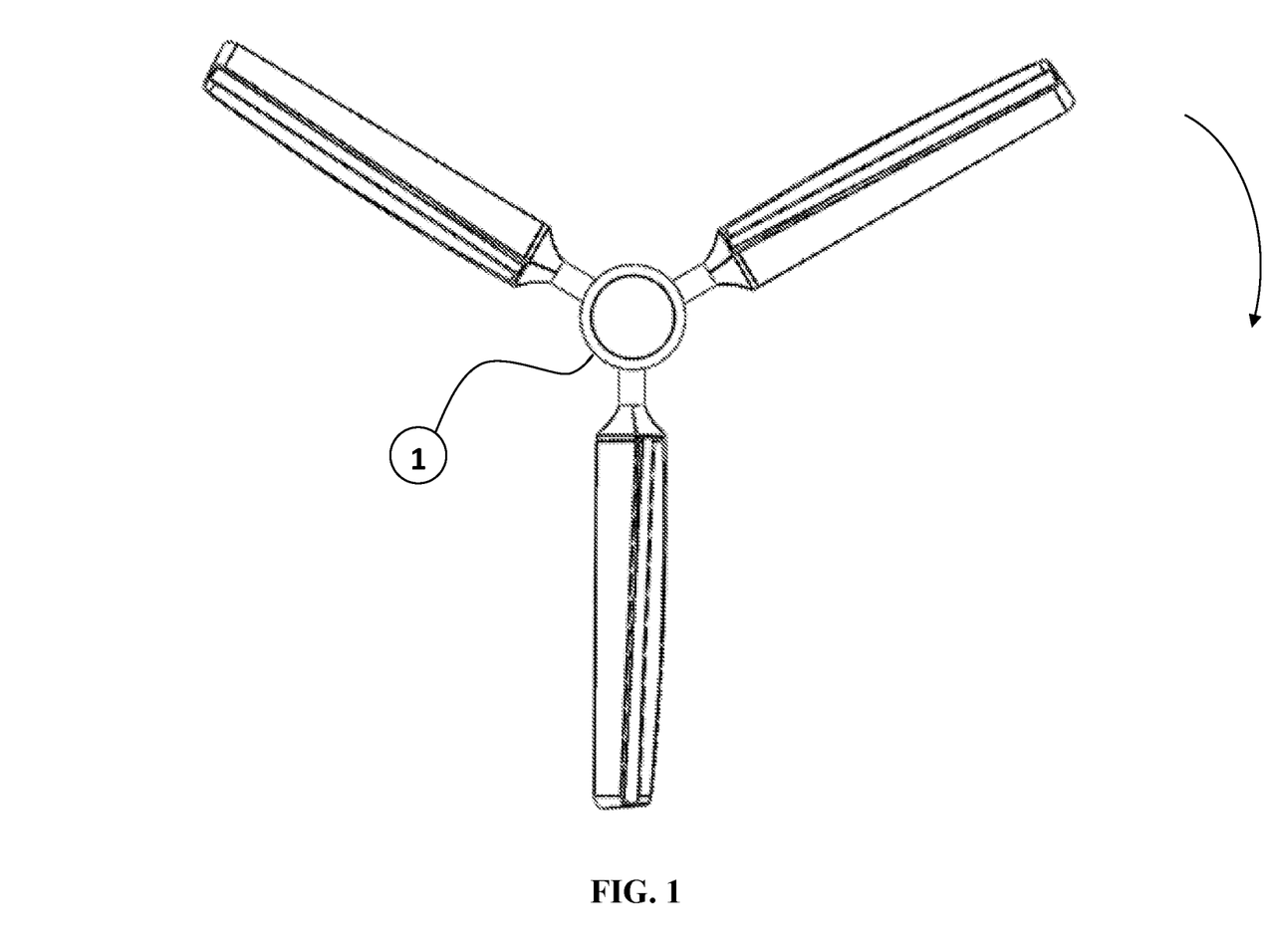
FIG. 1 The top view of the efficient axial fan with multiple profiles and beam.
Figure 2:
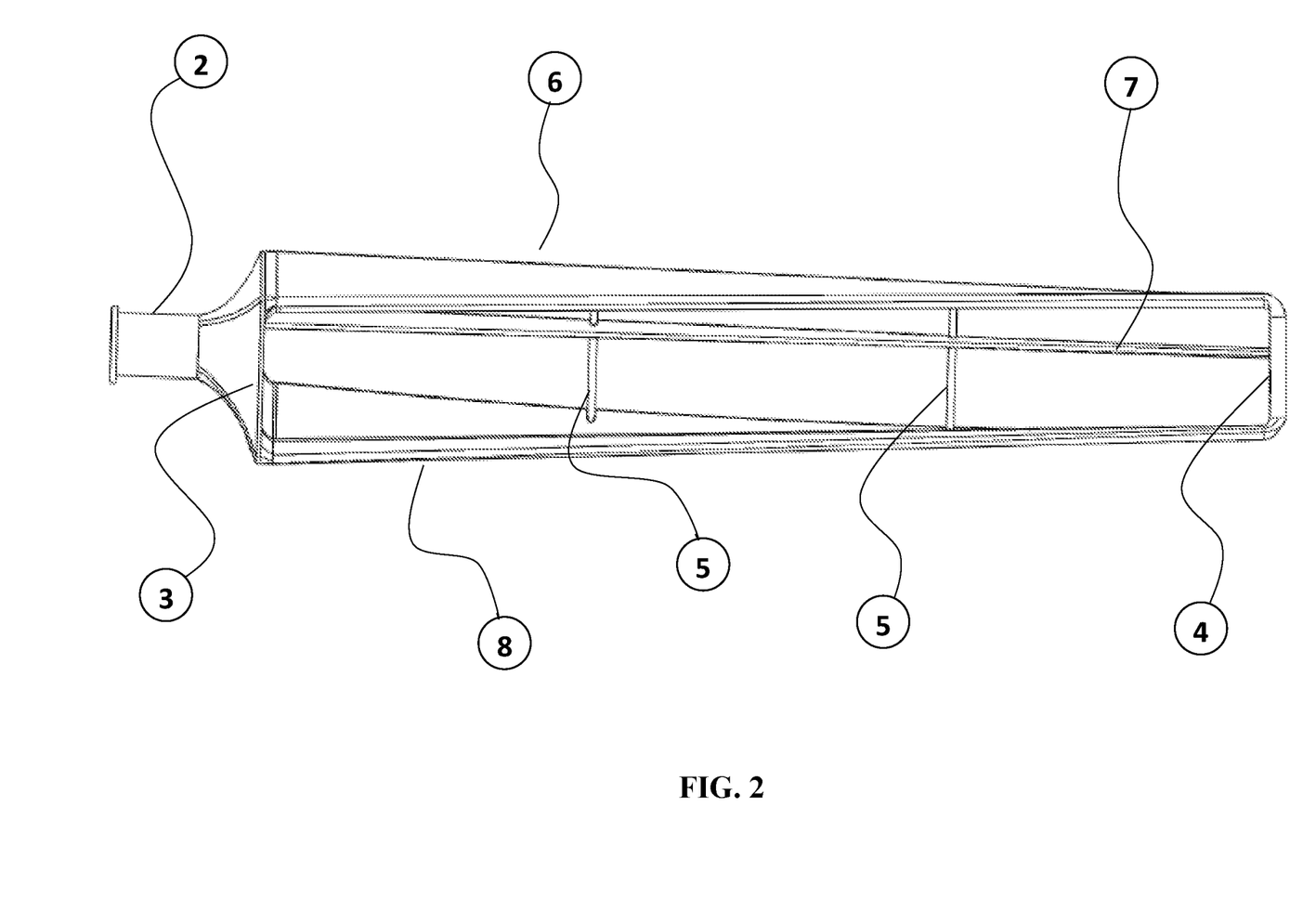
FIG. 2 The frontal view of the efficient axial fan with multiple profiles and beam.
Figure 3:
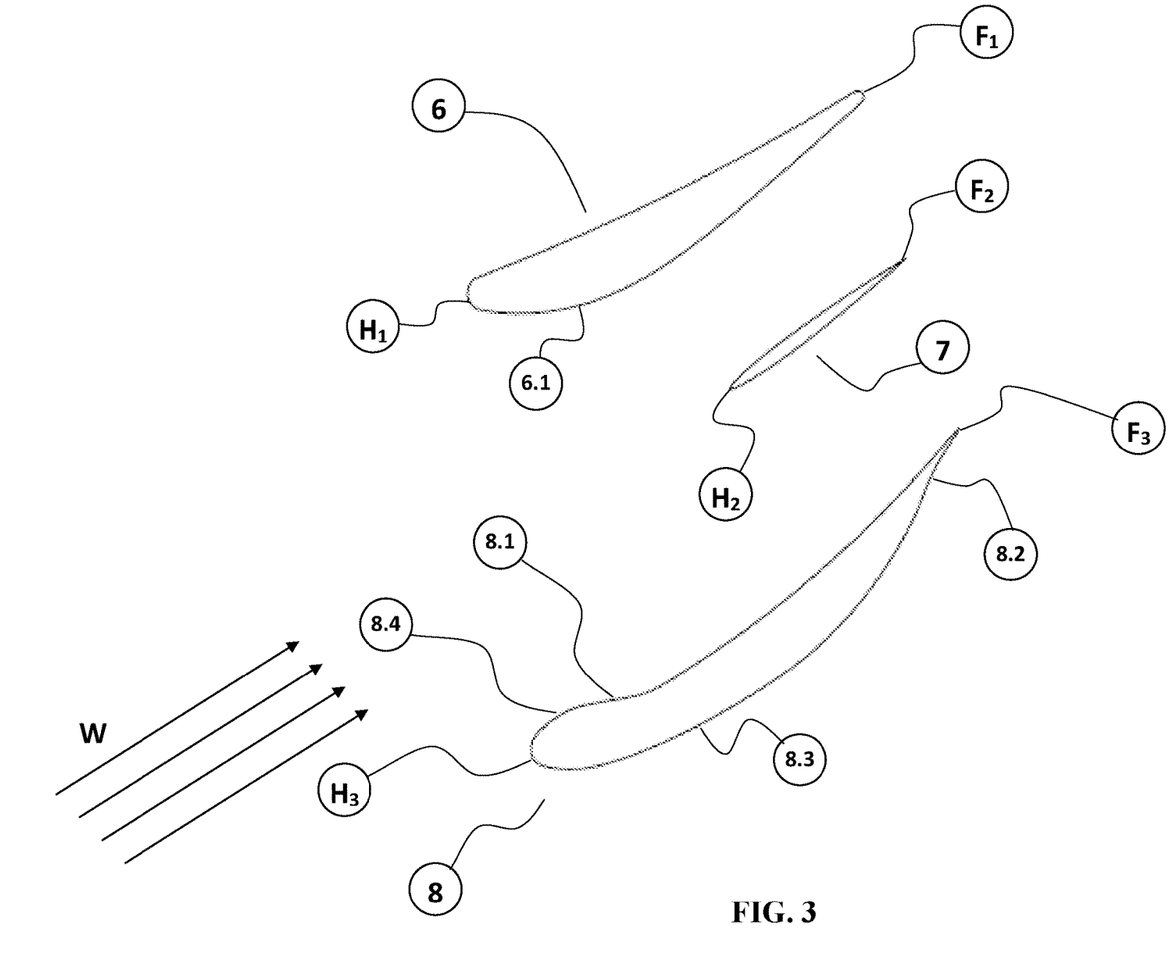
FIG. 3 The sectional view of upper camber, mean camber and lower camber.
Figure 4:
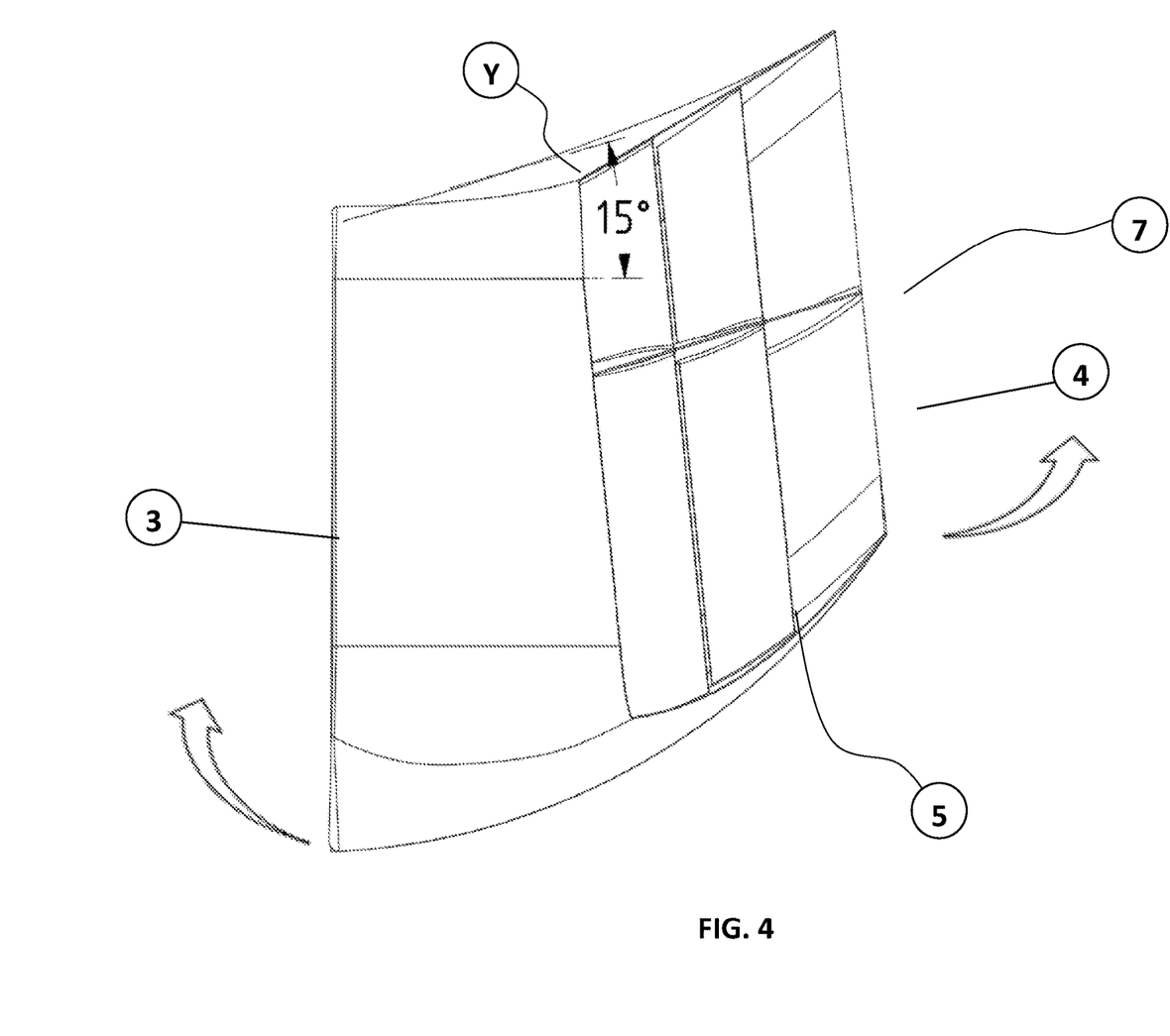
FIG. 4 The perspective view of the efficient axial fan with multiple profiles and beam.
Figure 5:
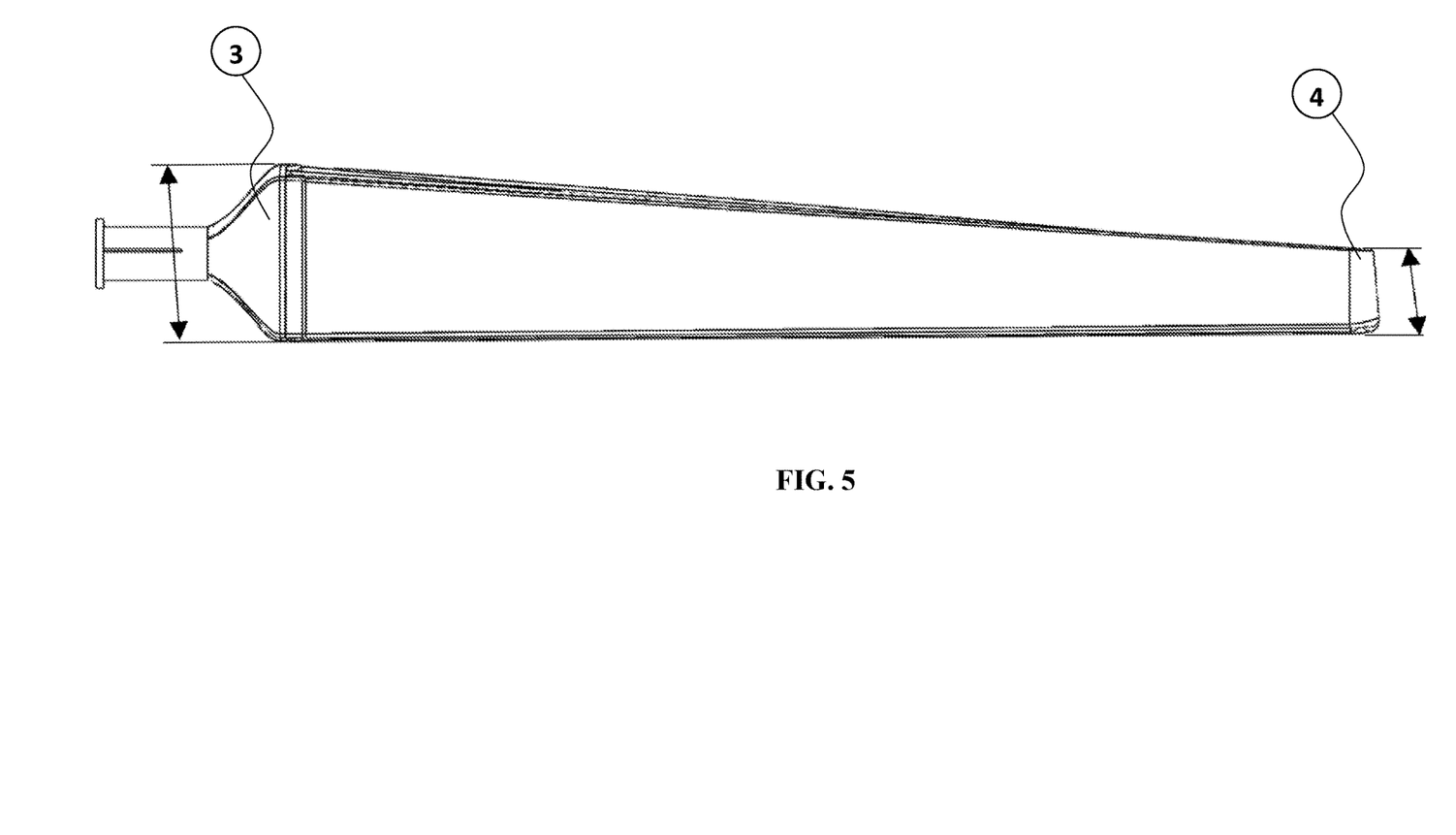
FIG. 5 Illustrates the ratio of roof end and tip end.
Figure 6:
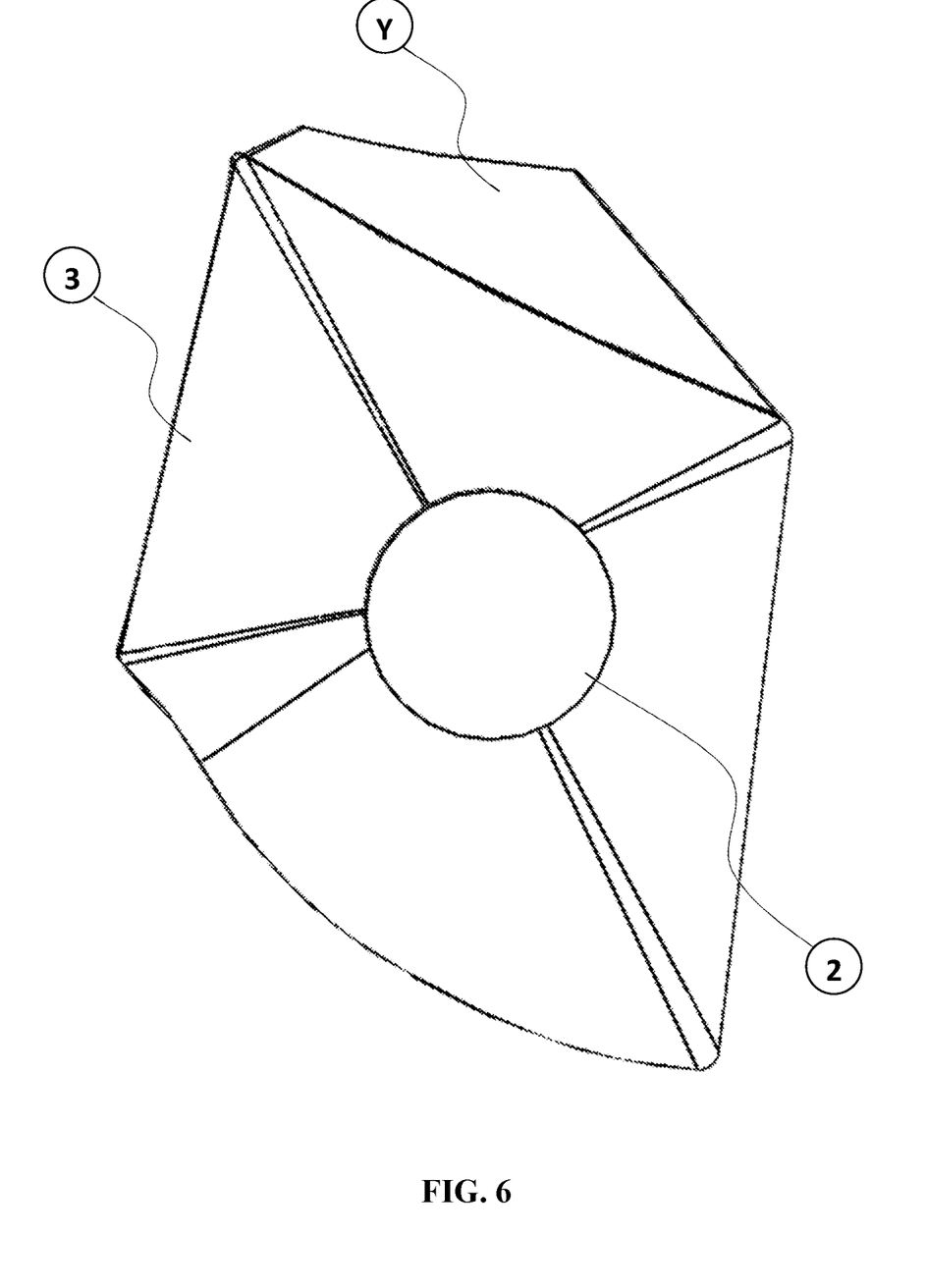
FIG. 6 The side view of the efficient axial fan with multiple profiles and beam while looking from roof end.

Our invention works more efficiently and quieter than other axial fans. It is the structure of the blades in our invention that they have a triple profile and profile structure. On the attack edge of the upper wing, the air is divided into two and dispersed on the lower and upper surfaces. While the upper surface of the upper wing sweeps air upwards, the air pressure drops and the fluid accelerates on the lower surface. Thus, the fluid proceeds linearly without being exposed to turbulence in the tunnel. The edge of attack along the wing is linear. In circular rotating wings, the linear velocity increases from the bottom to the end. The slowest linear velocity is closest to the center. Therefore, advantage should be added to the parts of the wing close to the center. In this context, there is an anticlockwise twisting of 15 degrees from the ends to the bottom. Also, the wing width increases as you go from tip to bottom (bottom width/tip width=2.13 fixed ratio). As a result, each unit area with different distances to the center can blow air evenly. In this way, homogeneous air flow is provided. The middle wing, on the other hand, prevents the turbulence from hitting the upper and lower wings of the fluid. The pointed end of the profile ensures that the air leaves the tunnel in the quietest way. As seen in FIG. 3, the change in the profile of the bottom profile towards the trailing edge enables the system to operate more efficiently and quietly. The inward curve causes sudden expansion of air and increased pressure. The wing creates a forward driving force. The tapered trailing end also prevents the air from turbulent. Thanks to the end edge, vortexes that will form at the bottom are prevented.

Our invention provides more air circulation with less energy than normal fans. It has a quieter working principle in buildings such as shopping malls and hospitals. Silence is an important factor in such buildings. It has the ability to work in different air flows with easy angle adjustment. In addition, electronic monitoring and control system can be integrated into the system, and engine speed and wing angle can be changed according to energy consumption according to need. Due to its structure, our wing profiles have less dynamic load on them than other wing profiles. Thanks to the beams located between the wings, extra strength is added to the structure. In addition, thanks to the 15 degree buckling of all 3 wings, the fluid leaves the tunnel linearly and at a homogeneous speed (7-8 m/s). In this way, the air flow rate reaches the optimum level in the tunnel because the fluid's rapid (12-15 m/s) movement in the tunnel increases the friction and reduces the efficiency.

Our invention has two different production methods. These are the printing with 3D printer and RTM method. In both, wings are produced in one piece. Thanks to the production of one-piece, their lifetimes are higher than other wing profiles. The percentage of the composite is determined according to the environment where the wings will be used. By adding recycled plastic to this composite material, we also highlight the environmentally friendly feature of our invention as well as providing energy savings. With the RTM method, we produce one piece of carbon, kevlar, or glass fiber wings. By drawing paint with high gelcoat and chemical resistance on its surface, we reveal light, high strength, low cost, and flexible wings that are resistant to environmental conditions.

The invention is a fan consisting of only 3 blades (4-9 blades in the market), provides easy installation (sufficient air flow is achieved with 3 blades). The short assembly time also reduces costs.

BRIEF DESCRIPTION OF THE DRAWINGS

The invention will now be described with reference to the accompanying figures, so that the features of the invention will be more clearly understood and appreciated, but not by limiting the invention to these particular embodiments. On the contrary, it is intended to cover all alternatives, modifications and equivalents that may be included within the scope of the invention as defined by the appended claims. It should be understood that the details are shown only for the purpose of illustrating preferred embodiments of the present invention and are provided the most useful and easily understood descriptions of both the method and the rules and conceptual features of the invention. In these drawings;

The figures that will help to understand the present invention are numbered as indicated in the attached picture and are given below with their names.

REFERENCES NUMBERS

1. Hub
2. Root sap
3. Root end
4. Tip end
5. Middle beam
6. Upper camber
    6.1. Surface $S_1$
7. Mean camber
8. Lower camber
    8.1. Surface $S_2$
    8.2. Surface $S_3$
    8.3. Surface $S_4$
    8.4. Surface $S_5$
$H_1$ Leading edge of upper camber
$H_2$ Leading edge of mean camber
$H_3$ Leading edge of lower camber
$F_1$ Trailing edge of upper camber
$F_2$ Trailing edge of mean camber
$F_3$ Trailing edge of lower camber
Y Surface of wing

DETAILED DESCRIPTION OF THE EMBODIMENTS

The present invention that efficient axial fan with multiple profiles and beam placed on the middle table (1) is comprised of upper camber (6) with a linear angle upper surface that expands from the leading edge of upper camber ($H_1$) to the top of the surface of $S_1$ (6.1) and decreases from this peak (6.1) to the trailing edge of upper camber ($F_1$), lower camber (8) with the parabolic curve vertex surface $S_5$ (8.4) and the reverse parabolic curve vertex surface $S_2$ (8.1) and the pointed lower surface as a result of a sudden curve towards the trailing edge of lower camber ($F_3$) of the surface $S_3$ (8.2), tip end (4) connecting the ends of the wings to prevent eddies to form at the ends, roof end (3) connecting the bottom of the wings, at least one middle beam (5) positioned between the lower camber (8) and the upper camber (6) associated with the tip end (4) and the roof end (3), mean camber (7) fixed on at least one middle beam (5)

located 90 degrees perpendicularly between the lower camber (8) and the upper camber (6).

The invention has upper camber (6), middle camber (7) and lower camber (8) with a positive torsional angle of 15° counterclockwise at the rate of increase in linear velocity from the bottom to the tip. The product of the present invention includes the mean camber (7), which is positioned at the same angle parallel to the upper camber (6) and the lower camber (8). The invention has a pointy structure of mean camber (7) with leading edge of mean camber ($H_2$) and trailing edge of mean camber ($F_2$). The invention has a middle beam (5) positioned in parallel between each other between the upper camber (6) and the lower camber (8). The invention preferably includes a circular cross-section and a root (2) fixed to the root end (3) associated with the upper camber (6), the mean camber (7) and the lower camber (8), depending on the bearing structure fixed on the hub (1). The root (2) has a structure that can rotate 360° around itself.

The invention has a maximum lower camber (8) thickness at 18% of profile length and 40% of chord length. The system subject to the invention has a 3-wing profile structure that creates an air tunnel by providing the air flow in a linear way. The product of the invention includes an upper camber (6) and lower camber (8) having a structure that narrows from the bottom to the tip. The upper/lower camber (6) and lower camber (8) bottom/tip ratio is 2.13. The root (2) of the invention has a wedge that allows the wing to be fixed at the desired angle. The invention has electronic control and monitoring system. The invention has upper camber (6), mean camber (7) and lower camber (8), which can be manufactured with a composite structure optionally formed by glass, carbon fiber and kevlar materials. The invention has upper camber (6), mean camber (7) and lower camber (8) optionally manufactured from ABS or PLA materials.

The present invention is comprised of hub (1), root (2), root end (3), tip end (4), middle beam (5), upper camber (6), mean camber (7), lower camber (8). The upper camber (6) of the invention has the surface $S_1$ (6.1). The lower camber (8) includes surface $S_2$ (8.1), surface $S_3$ (8.2), surface $S_4$ (8.3) and surface $S_5$ (8.4).

Upper camber (6), mean camber (7) and lower camber (8) in the invention are produced in one piece. Each wing; the connecting cage is attached to the middle table (1) with nuts and bolts. With the wedge located in the parts of the handle (2), the wings are prevented from turning around their own axis. After mounting the blades to the hub (1), the threaded shaft housing located in the middle of the hub (1) is seated on the reducer shaft. The wedge belonging to the reducer shaft is placed and tightened with a top cover and bolt.

The upper camber (6) has a Clark Y-type wing profile. The middle camber (7) has geo 445 airfoil (geo-445 province) profile. The lower camber (8) is combined with the upper surface of the boeing 707.08 span (b) lower surface with the roncz 1080 voyager inner aft wind airfoil (r1080-il) profiles. The maximum thickness is at the 18% point of the profile and 40% chord length. The name of the new profile is GT Profile.

The working principle of the product according to the invention is as follows; the air entering the system is divided into two on the leading edge of upper camber ($H_1$) of the upper wing and distributed to the upper and lower surfaces. The upper surface of the upper camber (6) provides the air to be swept upwards and this air is removed from the system. On the bottom surface, air accelerates, air pressure drops and moves linearly in the tunnel. The middle camber (7) prevents turbulence by hitting the air entering the tunnel to its upper and lower surfaces. Thanks to the trailing edge of mean camber ($F_2$) of the mean camber (7) being pointed (trailing edge of 1 mm), it allows the air to leave the tunnel quietly. The air entering the system is also divided into two on the leading edge of lower camber ($H_3$) of the lower camber (8). The pressure of the air accelerating on the lower surface of the lower camber (8) decreases on the surface of $S_4$ (8.3) and the pressure increases on the upper surface by reaching the surface $S_2$ (8.1). Force is generated towards the lower surface, which has a low pressure. In this part, the air moves out of the tunnel linearly with high pressure. The volume and pressure of the fluid reaching the $S_3$ point (8.2) increases suddenly and the speed decreases. In this way, the wing exerts force in the opposite direction. This force positively affects the wing in the direction of rotation.

The values of a fan currently used with our system subject to our invention have been measured using calibrated devices, and the actual values have been specified below in Table-1 and Table-2. In the measurement method, the actual values of the currently used aluminum fan are measured. Then, the aluminum fan was removed from its place and the product subject to our invention was replaced and the measurement was made again under the same ambient conditions. In addition, the analysis of the mass characteristics of the aluminum fan blade and our product according to the invention are given below using computer program analysis (ANSYS, XFLOW).

TABLE 1

Power and air flow absorbed by the aluminum fan system according to the actual measurement

| Virtual Power | Reactive Power | Power Factor | Active Power | Air Flow |
|---|---|---|---|---|
| 57.23 kVA | 25.55 KVAr | 0.89 | 51.20 kW | 442.562 m$^3$/h |

According to the results of the analysis, the mass characteristics of the existing aluminum fan blade:

Density=2700.00 kg/m$^3$

Mass=233.27 kg

Volume=0.09 m$^3$

Surface Area=8.39 m$^2$

Centre of Mass: (m)

X=0.23

Y=0.06

Z=−0.24

Primary inertial axes and primary moments of inertia: (kg*m$^2$)

It is taken from the center of mass.

| Ix = (0.99, 0.00, 0.15) | Px = 208.95 |
| Iy = (0.15, 0.00, −0.99) | Py = 208.95 |
| Iz = (0.00, 1.00, 0.00) | Pz = 417.12 |

Moment of inertia: (kg*m$^2$)

It is taken from the center of mass and the output is aligned with the coordinate system.

| Lxx = 208.95 | Lxy = 0.00 | Lxz = 0.00 |
| Lyx = 0.00 | Lyy = 417.12 | Lyz = 0.00 |
| Lzx = 0.00 | Lzy = 0.00 | Lzz = 208.95 |

Moment of inertia: (kg*m$^2$)

Output is aligned with the coordinate system.

| Ixx = 223.74 | Ixy = 3.17 | Ixz = −13.22 |
|---|---|---|
| Iyx = 3.17 | Iyy = 443.59 | Iyz = −3.36 |
| Izx = −13.22 | Izy = −3.36 | Izz = 222.23 |

Average pressure value on aluminum wings: 543.095 Pa

TABLE 2

Power and air flow used by our fan system according to the real measurement

| Virtual Power | Reactive Power | Power Factor | Active Power | Air Flow |
|---|---|---|---|---|
| 15.32 kVA | 9.58 kVAr | 0.78 | 11.95 kW | 518.101 m³/h |

According to the results of the analysis, the mass properties of our fan system:
Density=1370.00 kg/m³
Mass=150.73 kg
Volume=0.11 m³
Surface Area=13.99 m²
Centre of Mass: (m)
X=0.00
Y=−0.02
Z=−0.22
Primary inertial axes and primary moments of inertia: (kg*m²)
It is taken from the center of mass.

| Ix = (0.62, 0.00, 0.78) | Px = 181.99 |
|---|---|
| Iy = (0.78, 0.00, −0.62) | Py = 182.94 |
| Iz = (0.00, 1.00, 0.00) | Pz = 356.52 |

Moment of inertia: (kg*m²)
It is taken from the center of mass and the output is aligned with the coordinate system.

| Lxx = 182.57 | Lxy = −0.03 | Lxz = 0.46 |
|---|---|---|
| Lyx = −0.03 | Lyy = 356.52 | Lyz = 0.00 |
| Lzx = 0.46 | Lzy = 0.00 | Lzz = 182.36 |

Moment of inertia: (kg*m²)
Output is aligned with the coordinate system.

| Ixx = 197.96 | Ixy = −0.05 | Ixz = 0.25 |
|---|---|---|
| Iyx = −0.05 | Iyy = 371.76 | Iyz = 1.49 |
| Izx = 0.25 | Izy = 1.49 | Izz = 182.51 |

The basic formula that enables us to analyze efficiency in fans:

$$n=((Q*TP)/(1000*P))/100$$

Q=Air Flow (m³/s)
TP=Total Pressure (Pascal)
P=Active Power (kW)
n=Efficiency
Average pressure value occurring in our wing subject to the invention: 550.235 Pa
The efficiency value of the currently used aluminum fan system:

$$n=((122,93*8,39*543)/(1000*51,20))/100=\%10.94$$
efficiency of the fan

The efficiency value of our fan system subject to the invention:

$$n=((143,917*13,99*550)/(1000*11,95))/100=\%92.67$$
efficiency of the fan

As can be seen from the tables above, our invention's wing profile structure designed with aerodynamic calculations and the fact that the wing consists of a triple wing profile increased the volume of air passing through the wings per unit time, significantly increasing the efficiency and reducing the amount of energy it consumes.

What is claimed is:

1. An efficient axial fan with multiple profiles and a beam placed on a hub, comprising:
    an upper camber, a mean camber, and a lower camber with a positive torsional angle of 15° counterclockwise at a rate of an increase in a linear velocity from a first bottom to a first tip,
    a tip end connecting ends of wings to prevent eddies to form at the ends,
    a roof end connecting a bottom of the wings, and
    at least one middle beam positioned between the lower camber and the upper camber associated with the tip end and the roof end,
    wherein, the mean camber fixed on the at least one middle beam located 90 degrees perpendicularly between the lower camber and the upper camber.

2. The efficient axial fan with the multiple profiles and the beam according to claim 1, wherein the upper camber comprises a structure with a linear angle upper surface, the linear angle upper surface expanding from a leading edge of the upper camber to a top of a surface and decreasing from a peak to a trailing edge of the upper camber.

3. The efficient axial fan with the multiple profiles and the beam according to claim 1, wherein the upper camber and the mean camber are positioned at a same angle parallel to the lower camber.

4. The efficient axial fan with the multiple profiles and the beam according to claim 1, further comprising a pointy structure of the mean camber with a leading edge of the mean camber and a trailing edge of the mean camber.

5. The efficient axial fan with the multiple profiles and the beam according to claim 1, wherein the at least one middle beam is positioned in parallel between each other between the upper camber and the lower camber.

6. The efficient axial fan with the multiple profiles and the beam according to claim 1, wherein a maximum thickness of the lower camber is 18% of a length of the multiple profiles and 40% of a length of a chord.

7. The efficient axial fan with the multiple profiles and the beam according to claim 1, further comprising a 3-wing profile structure, wherein the 3-wing profile structure creates an air tunnel by providing an air flow in a linear way.

8. The efficient axial fan with the multiple profiles and the beam according to claim 1, wherein the upper camber is a structure narrowing from a second bottom to a second tip, and the lower camber is a structure: narrowing from a third bottom to a third tip.

9. The efficient axial fan with the multiple profiles and the beam according to claim 8, wherein a ratio of the second bottom to the second tip is 2.13, and a ratio of the third bottom to the third tip is 2.13.

10. The efficient axial fan with the multiple profiles and the beam according to claim 1, further comprising an electronic control and monitoring system.

11. The efficient axial fan with the multiple profiles and the beam according to claim 1, wherein the upper camber, the mean camber, and the lower camber are manufactured with a composite structure formed by a glass, a carbon fiber, and a kevlar material.

12. The efficient axial fan with the multiple profiles and the beam according to claim 1, wherein the upper camber, the mean camber, and the lower camber are manufactured from ABS or PLA materials.

13. The efficient axial fan with the multiple profiles and the beam according to claim 1, wherein the lower camber comprises a parabolic curve vertex surface, a reverse parabolic curve vertex surface, and a pointed lower surface as a result of a sudden curve towards a trailing edge of a lower camber of a surface.

\* \* \* \* \*